United States Patent
Meng et al.

(10) Patent No.: US 11,085,821 B2
(45) Date of Patent: Aug. 10, 2021

(54) SPECTROMETER AND SPECTRAL DETECTION AND ANALYSIS METHOD USING THE SAME

(71) Applicant: BOE TECHNOLOGY GROUP CO., LTD., Beijing (CN)

(72) Inventors: Xianqin Meng, Beijing (CN); Wei Wang, Beijing (CN); Jifeng Tan, Beijing (CN); Xiaochuan Chen, Beijing (CN); Xiandong Meng, Beijing (CN); Jian Gao, Beijing (CN); Fangzhou Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/643,015

(22) PCT Filed: Aug. 14, 2019

(86) PCT No.: PCT/CN2019/100610
§ 371 (c)(1),
(2) Date: Feb. 28, 2020

(87) PCT Pub. No.: WO2020/035003
PCT Pub. Date: Feb. 20, 2020

(65) Prior Publication Data
US 2020/0340859 A1  Oct. 29, 2020

(30) Foreign Application Priority Data

Aug. 15, 2018 (CN) .......................... 201810930403.4

(51) Int. Cl.
*G01J 3/18* (2006.01)
*G01N 21/25* (2006.01)
(Continued)

(52) U.S. Cl.
CPC .......... *G01J 3/1838* (2013.01); *G01N 21/255* (2013.01); *G01N 21/31* (2013.01); *G01N 21/85* (2013.01); *G01J 2003/1876* (2013.01)

(58) Field of Classification Search
None
See application file for complete search history.

(56) References Cited

U.S. PATENT DOCUMENTS

| | | |
|---|---|---|
| 6,940,593 B2 | 9/2005 | Farr |
| 8,395,768 B2 | 3/2013 | Li et al. |

(Continued)

FOREIGN PATENT DOCUMENTS

| | | |
|---|---|---|
| CN | 101263372 A | 9/2008 |
| CN | 102507448 A | 6/2012 |

(Continued)

OTHER PUBLICATIONS

First Office Action and English language translation, CN Application No. 201810930403.4, dated Jul. 1, 2020, 13 pp.

*Primary Examiner* — Dominic J Bologna
(74) *Attorney, Agent, or Firm* — Myers Bigel, P.A.

(57) ABSTRACT

A spectrometer and a spectral detection and analysis method implemented by the spectrometer. The spectrometer includes an optical device and a detection device. The optical device includes at least one light filter, each of which including at least two light filtering units, so that the optical device can emit at least two kinds of monochromatic light. The detection device includes at least one detector, each of which comprising at least two detection units facing at least two light filtering units in the corresponding light filter in a one-to-one relationship. The monochromatic light emitted from the light filtering unit is emitted along the direction perpendicular to the direction of the light emitting surface.

19 Claims, 9 Drawing Sheets

(51) Int. Cl.
*G01N 21/31* (2006.01)
*G01N 21/85* (2006.01)

(56) References Cited

U.S. PATENT DOCUMENTS

| | | | | |
|---|---|---|---|---|
| 2006/0262303 | A1* | 11/2006 | Bonne | G01F 1/6845 |
| | | | | 356/328 |
| 2007/0147726 | A1 | 6/2007 | Kiesel et al. | |
| 2014/0253923 | A1* | 9/2014 | Shibayama | G01J 3/0259 |
| | | | | 356/451 |
| 2016/0025564 | A1 | 1/2016 | Zhang et al. | |
| 2016/0116409 | A1* | 4/2016 | Massetti | G01N 21/253 |
| | | | | 436/172 |
| 2019/0017871 | A1* | 1/2019 | Choi | G01J 3/0213 |
| 2019/0301930 | A1* | 10/2019 | Loi | G01J 3/36 |
| 2020/0108387 | A1 | 4/2020 | Dong et al. | |

FOREIGN PATENT DOCUMENTS

| | | | |
|---|---|---|---|
| CN | 103134587 | A | 6/2013 |
| CN | 103842783 | A | 6/2014 |
| CN | 104515597 | B | 4/2015 |
| CN | 105444887 | A | 3/2016 |
| CN | 105548096 | A | 5/2016 |
| CN | 105806796 | A | 7/2016 |
| CN | 206497030 | U | 9/2017 |
| CN | 107607475 | A | 1/2018 |
| CN | 108956469 | A | 12/2018 |
| JP | 2002-310796 | | 10/2002 |
| KR | 10-2018-0028592 | A | 3/2018 |

* cited by examiner ved in the US 11,085,821 B2

SPECTROMETER AND SPECTRAL DETECTION AND ANALYSIS METHOD USING THE SAME

CROSS REFERENCE TO RELATED APPLICATIONS

The present application is a 35 U.S.C. 371 national stage application of PCT International Application No. PCT/CN2019/100610, filed on Aug. 14, 2019, which claims the benefit of Chinese Patent Application No. 201810930403.4, filed on Aug. 15, 2018 and titled "Spectrometer System and Spectral Analysis Method", the entire disclosures of which are incorporated herein by reference.

TECHNICAL FIELD

The present disclosure relates to the field of optoelectronic technology, and particularly to a spectrometer and a spectral detection and analysis method using the spectrometer.

BACKGROUND

With the development of optoelectronic technology, conducting spectral analysis by a spectrometer has become an implementation of substance detection. The core of the spectrometer is a spectral light splitting system. According to the different light splitting principles, the light splitting system of the spectrometer can be divided into a chromatic dispersion type and a modulation type. A chromatic dispersive light splitting system comprises, e.g., a prism, a grating, an interferometer and the like, and a modulated light splitting system comprises, e.g., a Fourier transform spectrometer. In the chromatic dispersive light splitting system, the prism light splitting system has a low chromatic dispersion rate and poor light splitting performance, while the grating light splitting system can realize wide spectral measurement with high resolution. Therefore, in practical application, a grating alone or a chromatic dispersive light splitting system made by a combination of a grating and a prism can normally be used as the core component of a spectrometer.

SUMMARY

According to one aspect of the present disclosure, there is provided a spectrometer, comprising: an optical device configured to receive a polychromatic incident light and emit at least two kinds of monochromatic light, the optical device comprising: a first substrate formed of a transparent material and comprising a light incident surface and a light emitting surface parallel to each other, the light incident surface and the light emitting surface being provided with a light blocking layer, the light blocking layer on the light incident surface comprising at least one light incident opening, the light blocking layer on the light emitting surface comprising correspondingly at least one light emitting opening, the at least one light incident opening being aligned with the at least one light emitting opening one by one; at least one light filter, the at least one light filter corresponding to the at least one light emitting opening one by one and each light filter being arranged in a corresponding light emitting opening, each light filter comprising at least two light filtering units, a light filtering unit being configured to allow only the transmission of light having a wavelength within a certain wavelength range; a detection device configured to receive the at least two kinds of monochromatic light emitted from the optical device and generate a detection signal, the detection device comprising: a support component comprising a light receiving surface that is adjacent and parallel to the light emitting surface of the first substrate so that a gap is formed between the light receiving surface and the light emitting surface to form a test channel; at least one detector arranged in the light receiving surface of the support component, and facing the at least one light filter in a one-to-one relationship, each detector comprising at least two detection units that face at least two light filtering units in a corresponding light filter in a one-to-one relationship, receive the monochromatic light emitted from the at least two light filtering units and passing through the test channel, and generate electrical signals based on the received monochromatic light, wherein the monochromatic light emitted from the light filtering unit emits along the direction perpendicular to the light emitting surface.

According to some exemplary embodiments of the present disclosure, the first substrate is made of glass, resin or a polyester compound.

According to some exemplary embodiments of the present disclosure, the support component is a second substrate made of glass, resin, a polyester compound or paper.

According to some exemplary embodiments of the present disclosure, the light filter is a light filtering color film.

According to some exemplary embodiments of the present disclosure, the light filtering color film is a quantum dot color film.

According to some exemplary embodiments of the present disclosure, the light filter is a linear gradient light filtering sheet.

According to some exemplary embodiments of the present disclosure, the linear gradient light filtering sheet comprises a first film layer comprising a first surface and a second surface forming a wedge angle; a second film layer arranged on the first surface and the second surface; wherein each part of the linear gradient light filtering sheet forms each light filtering unit in the light filter.

According to some exemplary embodiments of the present disclosure, the first film layer is formed of $SiO_2$, and the second film layer is formed of $Ta_2O_5$.

According to some exemplary embodiments of the present disclosure, a light blocking spacer is arranged between adjacent light filtering units in each light filter.

According to some exemplary embodiments of the present disclosure, the detector is a photosensitive detector.

According to some exemplary embodiments of the present disclosure, the spectrometer also comprises at least one light source integratedly arranged on the light incident surface of the first substrate and corresponding to the at least one light incident opening in a one-to-one relationship, each of the light sources is located on the corresponding light incident opening, wherein each of the light sources comprises a micro light-emitting diode and a micro lens, and the micro lens is configured to expand and collimate the light emitted by the micro light-emitting diode.

According to some exemplary embodiments of the present disclosure, the light source generates white light within a wavelength range of 400-750 nm.

According to some exemplary embodiments of the present disclosure, the detection device also comprises a microfluidic channel arranged on the light incident side of each detection unit, each microfluidic channel is used for the inflow of an object to be tested passing through the test channel, so that the monochromatic light within the target wavelength range emitted from a corresponding light filtering unit irradiates a corresponding the detection unit after passing through the object to be tested in a corresponding microfluidic channel.

According to some exemplary embodiments of the present disclosure, the microfluidic channel is provided therein with a hydrophobic film layer or a hydrophilic film layer.

According to some exemplary embodiments of the present disclosure, the optical device also comprises at least one light splitter, the at least one light splitter correspond to the at least one light incident opening in a one-to-one relationship and each light splitter is arranged in a corresponding light incident opening and configured to split the incident light entering the light incident opening into at least two kinds of monochromatic light, the at least two kinds of monochromatic light correspond to at least two light filtering units in a corresponding light filter in a one-to-one relationship, and are filtered by the light filtering unit correspondingly and emitted from the light filtering units correspondingly.

According to some exemplary embodiments of the present disclosure, the light splitter is a holographic grating comprising a waveguide layer, a buffer layer and a metal pattern layer sequentially arranged from the light incident surface of the first substrate, and the metal pattern layer comprises at least two areas with different grating structures, each grating structure corresponds to a monochromatic light.

According to some exemplary embodiments of the present disclosure, the light filtering unit is a filter grating configured to emit corresponding monochromatic light along a direction perpendicular to the light emitting surface.

According to some exemplary embodiments of the present disclosure, it also comprises a processing module connected with the detection units, which receives the detection signal generated by the detection units and processes the detection signal to obtain the analysis result of the object to be tested.

According to another aspect of the present disclosure, there is provided a spectral detection and analysis method using the spectrometer, comprising the steps of: making the object to be tested flow into the test channel; receiving the detection signal generated by the detection units of the detection device, wherein the detection signal is generated based on the monochromatic light emitted from the corresponding light filtering units and irradiating the detection units after passing through the test channel and irradiating the object to be tested; and processing the detection signal to obtain the analysis result of the object to be tested.

BRIEF DESCRIPTION OF DRAWINGS

The drawings are used to provide a fuller understanding of the exemplary embodiments of the present disclosure and constitute a part of the specification. Together with the exemplary embodiments of the present disclosure, the drawings are used to explain the technical solutions of the present disclosure, but do not constitute a limitation to the technical solutions of the present disclosure. In the drawings.

It shall be understood that the drawings are not necessarily drawn to scale. Moreover, identical or similar elements, components or parts are indicated by the same reference numerals throughout the drawings.

DETAILED DESCRIPTION

Figure 1:
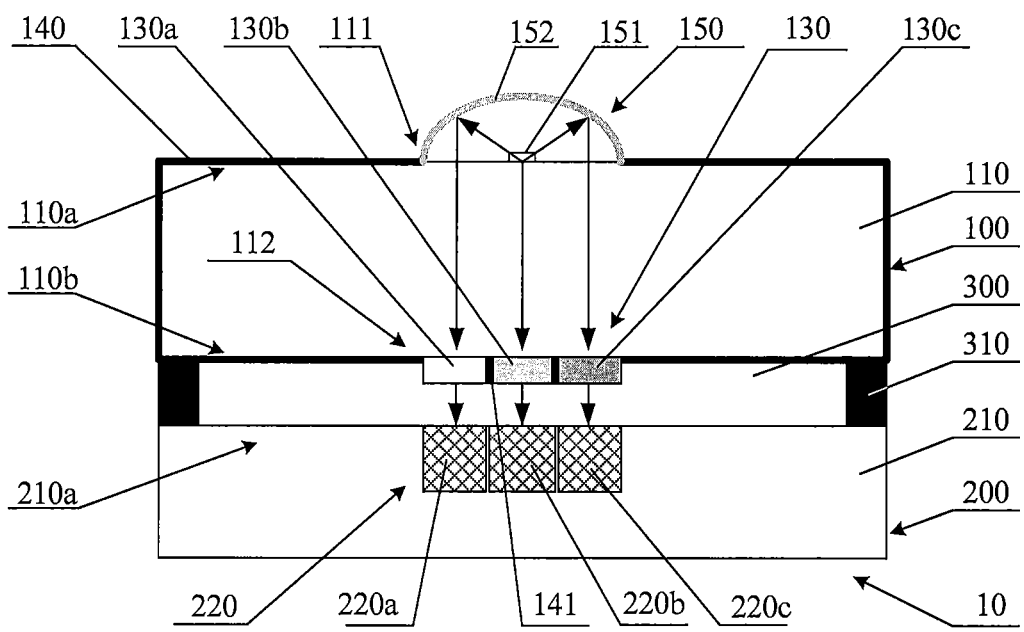
FIG. 1 is a structural schematic view of a spectrometer according to an exemplary embodiment of the present disclosure.

The exemplary embodiments of the present disclosure will be described below in detail with reference to the drawings of the specification.

It will be understood that although terms such as "first" and "second" and the like can be used herein to describe various elements, components and/or parts, these elements, components and/or parts should not be restricted by the terms. These terms are only used to distinguish one element, component or part from another. Therefore, the first element, component or part discussed below may also be referred to as the second or third element, component or part without departing from the teachings of the present disclosure.

The terms used herein are only used for the purpose of describing a particular embodiment, rather than limiting the present disclosure. As used herein, the singular forms of "a", "an" and "the" are also intended to include the plural forms, unless otherwise specified clearly in the context. It shall also be understood that the terms such as "comprise" and/or "include" used in the specification of the present disclosure indicate the presence of the features, entities, steps, operations, elements and/or components as described, but do not exclude the presence of one or more other features, entities, steps, operations, elements, components and/or groups thereof, or the addition of one or more other features, entities, steps, operations, elements, components and/or groups thereof. Moreover, the term "and/or" used herein comprises any and all combinations of one or more related items as listed.

It shall be understood that when an element is described as "connected to another element" or "coupled to another element", it may be directly connected to another element or directly coupled to another element, or there may be an intermediate element. To the contrary, when an element is described as "directly connected to another element" or "directly coupled to another element", there is no intermediate element.

Unless otherwise defined, all terms (including technical terms and scientific terms) used herein have the same meaning as commonly understood by one having ordinary skills in the art, to which the present disclosure belongs. It should also be understood that terms such as those defined in a common dictionary should be construed as having the same meaning as in the related art and/or in the context of the present specification, and will not be construed in an ideal or overly formal sense, unless defined explicitly as such herein.

It should also be explained that, in the description of the specification of the present application, descriptions referring to expressions such as "an embodiment", "some embodiments", "exemplary embodiments", "specific examples" or "some examples" are intended to mean that specific features, structures, materials or characteristics described in conjunction with the embodiments or examples are contained in at least one embodiment or example of this disclosure. Therefore, schematic descriptions with respect to the above expressions herein do not have to be only directed at the same embodiments or examples herein. Instead, specific features, structures, materials or characteristics described thereby can be combined in a suitable manner in any one or more embodiments or examples. Besides, where no contradiction is caused, one skilled in the art can combine and assemble different embodiments or examples described in the specification, and can combine and assemble features of different embodiments or examples described in the specification.

The steps involved in the method described in the present disclosure are exemplary, and are not necessarily to be implemented in the order as listed. Instead, one or more of these steps may be implemented in a different order or simultaneously according to actual situations. Furthermore, the described method may also comprise other additional steps according to actual situations.

Some techniques, structures and materials commonly known in the art of this disclosure are not described in detail for the sake of clarity so as to avoid making the present application tediously long.

At present, in a conventional spectrometer, when light splitting is conducted by a grating or a combination of a grating and a prism, the grating used is usually a large-period plane diffraction grating, and has the phenomenon of spectral overlapping and chromatic crosstalk, that is, there is stray light in the monochromatic light obtained from light splitting, which affects the detection effect of the spectrometer. In addition, the conventional spectrometer rotates the slit position through a mechanical rotating shaft to realize the extraction of monochromatic light. Such a light extraction structure has the problem in a deflection angle, which brings about the problems of difficult adjustment and poor stability, and also affects the detection precision to a certain extent.

FIG. 1 schematically shows the structure of a spectrometer 10 according to an exemplary embodiment of the present disclosure. As shown in FIG. 1, the spectrometer 10 may comprise an optical device 100 and a detection device 200. The optical device 100 comprises a first substrate 110 and a light filter 130. The first substrate 110 is formed of a transparent material and comprises a light incident surface 110a and a light emitting surface 110b parallel to each other.

The first substrate 110 may be a glass substrate, and also may be made of resin or a polyester compound with better stability, or be made of any material having a similar property. The light incident surface 110a and the light emitting surface 110b may be provided with a light blocking layer 140, and the light blocking layer 140 may be made of a material having light shading and absorbing effects. As shown in FIG. 1, the light blocking layer 140 on the light incident surface 110a forms a light incident opening 111, the light blocking layer 140a on the light emitting surface forms a corresponding light emitting opening 112, in which the light filter 130 is disposed. The detection device 200 comprises a second substrate 210 that comprises a light receiving surface 210a configured to be close to the light emitting surface 110b of the first substrate 110, thereby forming a test channel 300 between the light emitting surface 110b of the optical device 100 and the light receiving surface 210a of the second substrate 210. The second substrate 210 may also be a glass substrate, and may be made of resin or a polyester compound with better stability or paper, or be made of any material having a similar property.

In the mentioned structure of the spectrometer 10 according to an exemplary embodiment of the present disclosure, polychromatic incident light enters the optical device 100 and then irradiates the light filter 130, which filters the incident light and emits the monochromatic light within a target wavelength range. The emitted monochromatic light passes through the test channel 300 and irradiates the object to be tested therein, and then irradiates the detection device 200. In the spectrometer 10 as shown in FIG. 1, the light filter 130 includes three light filtering units, namely, a first light filtering unit 130a, a second light filtering unit 130b and a third light filtering unit 130c. Each light filtering unit allows only the transmission of light within a certain wavelength range, and the wavelength range defined by each light filtering unit does not intersect or partially overlap as much as possible. Thus, the first, second and third light filtering units 130a, 130b and 130c may filter the incident light into monochromatic light within the target wavelength range.

The first, second and third light filtering units 130a, 130b and 130c may use light filtering color films, for example, conventional color films, but they may also use other color films such as quantum dot color films. When the conventional color film is used, the half-peak width of each color is wide so that it may not be suitable for high-precision spectral detection. When the quantum dot color film is used, the half-peak width of each color may be reduced to thereby improve the detection precision for the sake of high-precision spectral detection. In addition, as shown in FIG. 1, a light blocking member 141 may be disposed between adjacent light filtering units, and the light blocking member 141 may be made of a material with light shading and light absorbing effects. However, the light blocking member 141 is not necessary. In other exemplary embodiments of the present disclosure, there is no light blocking member 141 provided between light filtering units of the filter.

The detection device 200 also comprises a detector 220 disposed in the light receiving surface 210a of the second substrate 210 for receiving the monochromatic light after irradiation of the object to be tested, and generating a corresponding detection signal based on the received monochromatic light so as to analyze the object to be tested. As a non-limiting example, the detection signal may be an electrical signal. In the spectrometer 10 as shown in FIG. 1, the detector 220 corresponds to the light filter 130, and comprises three detection units, namely, the first detection unit 220a, the second detection unit 220b and the third detection unit 220c. The first, second and third detection units 220a, 220b and 220c face the first, second and third light filtering units 130a, 130b and 130c in a one-to-one relationship, so as to receive the monochromatic light emitted from the corresponding filter unit and irradiating the object to be tested in the test channel 300. The first, second and third detection units 220a, 220b and 220c in the exemplary embodiment of the present disclosure are, for example, photo-sensitive detectors. These photo-sensitive detectors face the first, second and third light filtering units 130a, 130b and 130c of the optical device 100 in a one-to-one relationship. The spacing therebetween depends on the shape and size of the light filtering units and the detection units respectively, the alignment precision of them, the arrangement of arrays formed by a plurality of light filtering units and a plurality of detection units respectively and the signal-to-noise ratio requirement of the photo-sensitive detectors, and the spacing between the first, second and third light filtering units 130a, 130b and 130c and the first, second and third detection units 220a, 220b, 220c is made as small as possible (a buffer film layer and the like may be contained therebetween). The type of photo-sensitive detector may be a charge-coupled device (CCD), a complementary metal oxide semiconductor (CMOS), a PIN photodiode, etc., which will not be specified in the present disclosure.

It shall be understood that the above types and numbers of light filters, light filtering units, detectors and detection units are only exemplary and not restrictive. For example, in other exemplary embodiments of the present disclosure, the light filter 130 may comprise more or fewer light filtering units, and the detector 220 may also comprise more or fewer detection units, as long as the number of the light filtering units is equal to that of the detection units. In addition, in other exemplary embodiments of the present disclosure, the spectrometer may comprise a plurality of light filters 130 and a plurality of detectors 220 to thereby form arrays of the light filters 130 and the detectors 220.

The spectrometer 10 as shown in FIG. 1 also comprises a light source 150. The light source 150 may be integratedly arranged with the optical device 100 and arranged to align with the light incident opening 111 in the first substrate 110. The light source 150 may be configured to emit collimated light or non-collimated light. As shown in FIG. 1, the light source 150 may comprise a semiconductor laser chip or a light-emitting diode (LED) 151, but the present disclosure is not limited to these types. In order to match the size of the light incident opening 111, a laser chip or LED chip strip may be used, or some beam-expanding structures may be added in front of the sparsely-arranged laser chips or LED chip strips. In the spectrometer 10 as shown in FIG. 1, a micro-lens 152 is arranged to cover the micro-LED 151 and the light incident opening 111, so as to expand and/or collimate the light emitted from the micro-LED 151 in a reflective manner. In other exemplary embodiments of the present disclosure, the micro-lens 152 may also be arranged between the micro-LED 151 and the light incident opening 111 so as to expand and/or collimate the light emitted from the micro-LED 151 in a transmissive manner. However, it shall be understood that the light source 150 is not necessary, and in other exemplary embodiments of the present disclosure, it is also possible to receive collimated or non-collimated incident light from an external light source.

The detection device 200 and the optical device 100 may form a hermetic space by frame sealing glue 310. During the detection process, gas or liquid to be tested is injected into the test channel 300 to flow through the test channel 300. When the monochromatic light within the target wavelength range passes through the test channel 300, it will irradiate the object to be tested, and then irradiate the detection device 200 after acting with the object to be tested. Therefore, the detection device 200 receives the optical signals obtained after the monochromatic light within various target wavelength ranges respectively acts with the object to be tested, and generates a detection signal based on these optical signals. The detection signal may be used to analyze the object to be tested, so as to complete the calibration or detection of a specific object or gas.

Figure 2:
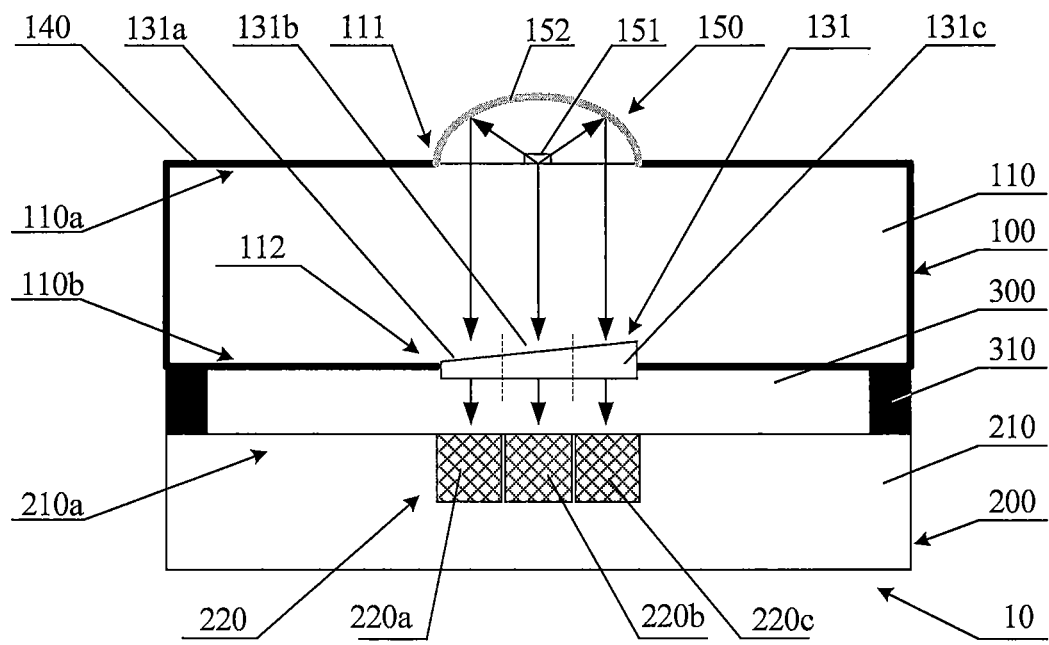
FIG. 2 is a structural schematic view of another spectrometer according to an exemplary embodiment of the present disclosure.

FIG. 2 is a structural schematic view of another spectrometer 10 according to an exemplary embodiment of the present disclosure. In comparison with the spectrometer 10 as shown in FIG. 1, the spectrometer 10 as shown in FIG. 2 differs only in the use of a different light filter, so only this difference will be explained in the following text.

The light filter in the spectrometer 10 as shown in FIG. 2 uses a linear gradient light filtering sheet 131 to filter the incident light. After the incident light is repeatedly reflected and refracted between the incident and emitting surfaces of the linear gradient light filtering sheet 131, it is transmitted out of the linear gradient light filtering sheet 131 at differently-positioned local areas of the linear gradient light filtering sheet 131, thereby filtering polychromatic incident light into a plurality of kinds of monochromatic light. As shown in FIG. 2, the linear gradient light filtering sheet 131 is roughly divided into a first local area 131a, a second local area 131b and a third local area 131c, which may split the incident light into three kinds of monochromatic light within the target wavelength range. Similarly, the first, second and third local areas 131a, 131b and 131c face the first, second and third detection units 220a, 220b and 220c in a one-to-one relationship, so that these detection units 220a, 220b and 220c can receive the monochromatic light emitted from the corresponding local area of the linear gradient light filtering sheet 131 and irradiating the object to be tested in the test channel 300.

Figure 3:
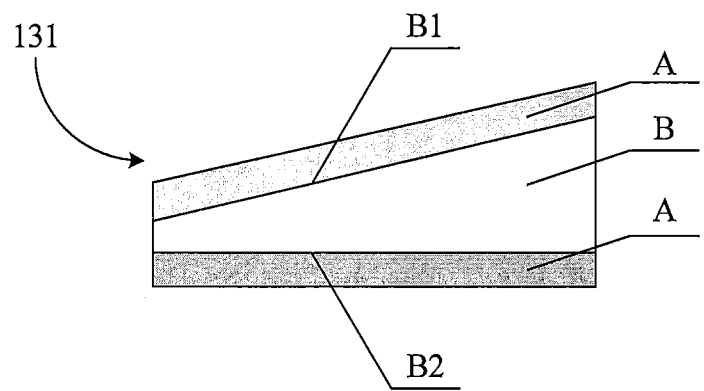
FIG. 3 schematically shows the structure of a linear gradient light filtering sheet in the spectrometer as shown in FIG. 2 in the form of a sectional view.

With reference to FIG. 3, it shows the film layer structure of the linear gradient light filtering sheet 131 in the form of a sectional view. The linear gradient light filtering sheet 131 comprises a first film layer B and two film layers A arranged outside of a first plane B1 and a second plane B2 of the first film layer B, wherein the first plane B1 and the second plane B2 of the first film layer B form a wedge angle. Specifically, the layer B with a wedge angle may be processed between two film layers A by etching or a special deposition process, and then the film B and the film A are alternately deposited on the two film layers A to form a Fabry-Perot cavity. In the spectrometer 10 as shown in FIG. 2, a wide spectrum color separation effect can be achieved by using the linear gradient light filtering sheet 131. The incident light is repeatedly reflected and refracted between the upper and lower surfaces of the Fabry-Perot cavity to generate a plurality of coherent reflected and transmitted light beams. The transmitted light is transmitted at the differently positioned local areas of the linear gradient light filtering sheet 131 to thereby realize color separation. The materials of the film A and the film B may be $Ta_2O_5$ and $SiO_2$, but they may also be other materials, which is not specifically limited in the present disclosure. However, it should be noted that the linear gradient light filtering sheet 131 has strict requirements on the wedge angle, the thickness of the film A and the film B, as well as the number of superimposed and deposited layers of the film A and the film B, and has higher requirements on deposition process.

The spectrometer 10 in FIGS. 1 and 2 according to the exemplary embodiments of the present disclosure is a micro spectrometer which may be used to measure the object to be tested of microdata magnitude, such as the nanoscale object to be tested. The spectrometer mainly comprises two parts: the optical device 100 and the detection device 200, wherein the optical device 100 filters the polychromatic incident light into the monochromatic light within a target wavelength range by a suitable light filter (for example, a light filtering color film or a linear gradient light filtering sheet), so that the spectrometer 10 can obtain the monochromatic light within a target wavelength range with no need of a large-period plane diffraction grating, thereby solving the problem of spectral overlapping and chromatic crosstalk of the conventional spectrometer. In addition, in the spectrometer 10, the detection units face the light filtering units in a one-to-one relationship, so that the extraction of the monochromatic light within the target wavelength can be realized without a large-size mechanical drive assembly, which also solves the problem of deflection angle in the conventional spectrometer.

Figure 4:
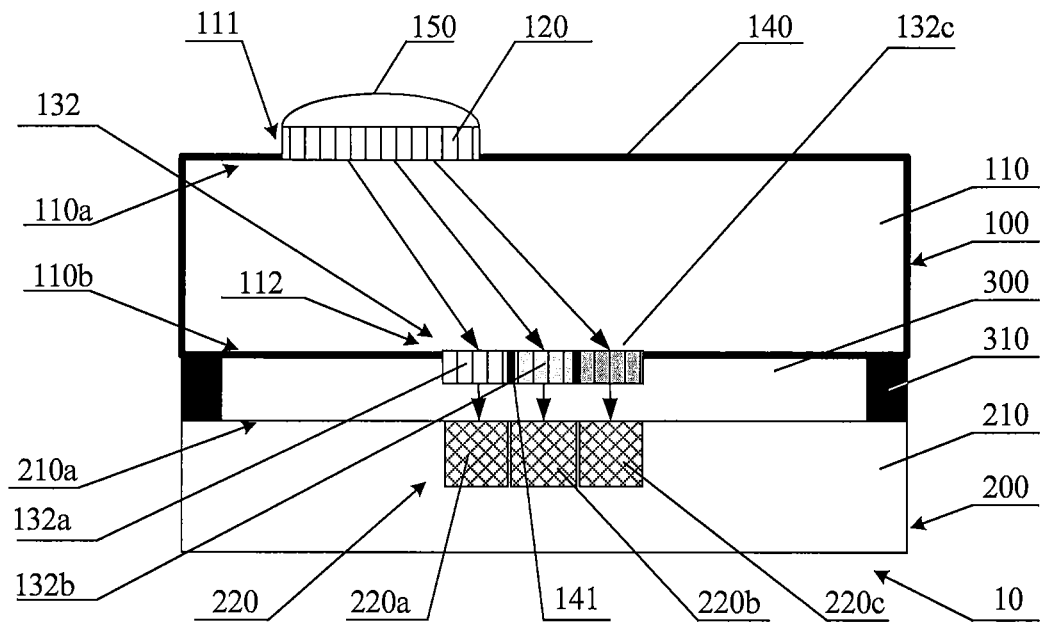
FIG. 4 is a structural schematic view of a further spectrometer according to an exemplary embodiment of the present disclosure.

FIG. 4 shows a structural schematic view of another spectrometer according to an exemplary embodiment of the present disclosure. In comparison with the spectrometer 10 as shown in FIG. 1, the spectrometer 10 as shown in FIG. 4 mainly differs in further comprising a light splitter 120 and the resulting modification of the light filter, so only this difference will be explained in the following text.

The light splitter 120 is arranged on the light incident surface 110a of the first substrate 110 and is located in the light incident opening 111. The light splitter 120 may be, for example, a grating, a prism, a combination of a grating and a prism, or other device or structure having a light splitting effect. As a non-limiting example, the light splitter 120 as shown in FIG. 4 may be, for example, a common diffraction grating. Due to the diffraction effect, the incident light is split into a plurality of monochromatic light beams after passing through the light splitter 120, and the transmission direction of these monochromatic light beams in the first substrate 110 will deviate from the normal direction of the light incident surface 110a. In addition, after the splitting of light by the light splitter 120, there will be light within other wavelength range transmitted to different degrees, which forms the stray light in the spectrometer 10, thereby reducing the detection precision of the spectrometer 10. In the spectrometer 10 as shown in FIG. 4, a secondary filter grating 132 is used as a light filter to filter the monochromatic light after light splitting. As shown in FIG. 4, the secondary filter grating 132 may comprise a first filter grating unit 132a, a second filter grating unit 132b, and a third filter grating unit 132c, each of which is a filter grating designed for monochromatic light obtained after light splitting. As a non-limiting example, tilt gratings may be used as the first, second and third filter grating units 132a, 132b and 132c, each tilt grating may be designed mainly for primary transmitted light, and only light within some small wavelength range is emitted at nearly 0 degree by taking advantage of the characteristics of the tilt grating, and light having other wavelength is reflected and then absorbed by the light blocking structure around the optical device 100. The first filter grating unit 132a, the second filter grating unit 132b and the third filter grating unit 132c respectively face the first detection unit 220a, the second detection unit 220b and the third detection unit 220c in the detector 220 in a one-to-one relationship. Thus, the optical device 100 in the spectrometer 10 as shown in FIG. 4 may also realize the splitting of white light with higher light splitting precision, so as to realize the high-precision microflow test or calibration. However, this manner requires a good alignment between the second grating (i.e. the secondary filtering grating 132) and the first grating (i.e. the diffraction grating), and it is also required to design different gratings again according to the wavelengths of the transmitted light after light splitting by the diffraction grating so as to realize further light splitting. Therefore, the optical device 100 with this structure requires high manufacture precision and is difficult to be manufactured.

Figure 5:
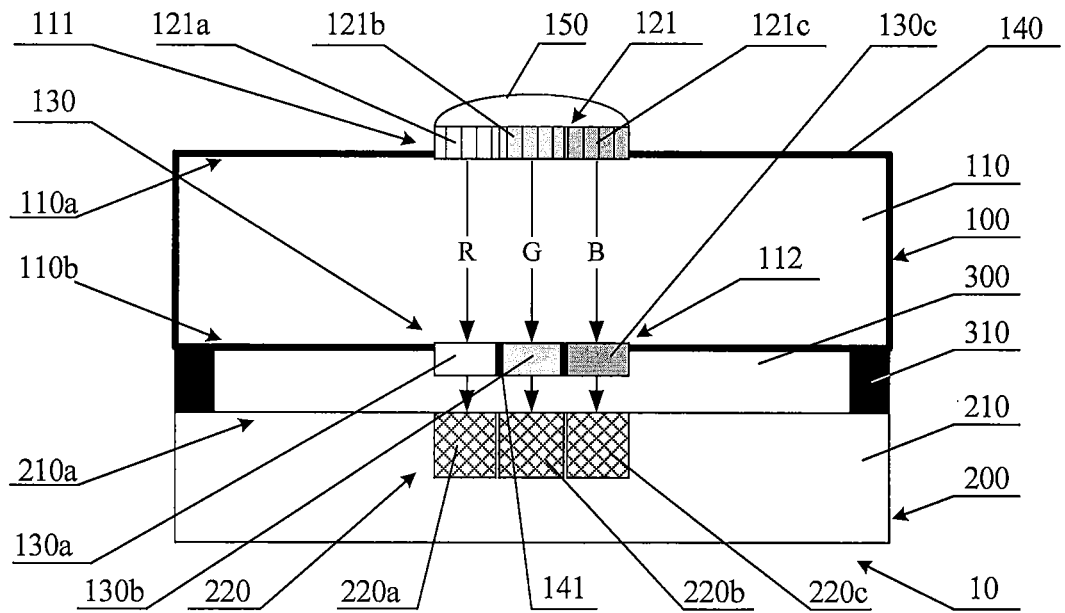
FIG. 5 is a structural schematic view of a yet spectrometer according to an exemplary embodiment of the present disclosure.

Now referring to FIG. 5, it is a structural schematic view of another spectrometer according to an exemplary embodiment of the present disclosure. In comparison with the spectrometer 10 as shown in FIG. 4, the spectrometer 10 as shown in FIG. 5 mainly differs in splitting the incident light by the holographic grating 121 so as to obtain monochromatic light within a plurality of target ranges. Thus, the spectrometer 10 as shown in FIG. 5 will be explained with respect to the above difference in the following text.

As shown in FIG. 5, the holographic grating 121 may comprise a first light splitting area 121a, a second light splitting area 121b, and a third light splitting area 121c for dividing the incident light into three kinds of monochromatic light with different wavelengths. As a non-limiting example, when the incident light is white light within a wavelength range of 400-750 nm, the holographic grating 121 may split the incident light into three kinds of monochromatic light: red light R, green light G and blue light B. For example, the first light splitting area 121a may allow the transmission of the red light R, the second light splitting area 121b may allow the transmission of the green light G, and the third light splitting area 121c may allow the transmission of the blue light B. The red light R, the green light G and the blue light B are incident into the filter 130 from the holographic grating 121 in its normal direction (that is, the direction perpendicular to the surface of the holographic grating 121). The filter 130 comprises three light filtering units, namely, the first light filtering unit 130a, the second light filtering unit 130b and the third light filtering unit 130c. The first light filtering unit 130a may filter the red light R irradiating it so as to remove the stray light, the second light filtering unit 130b may filter the green light G irradiating it so as to remove the stray light, and the third light filtering unit 130c may filter the blue light B irradiating it so as to remove the stray light. The filtered monochromatic light then irradiates the corresponding detection unit from each light filtering unit along its normal direction (that is, the direction perpendicular to the surface of the light filtering unit). The first detection unit 220a, the second detection unit 220b and the third detection unit 220c in the detector 220 respectively face the first light filtering unit 130a, the second light filtering unit 130b and the third light filtering unit 130c in a one-to-one relationship.

Figure 6:
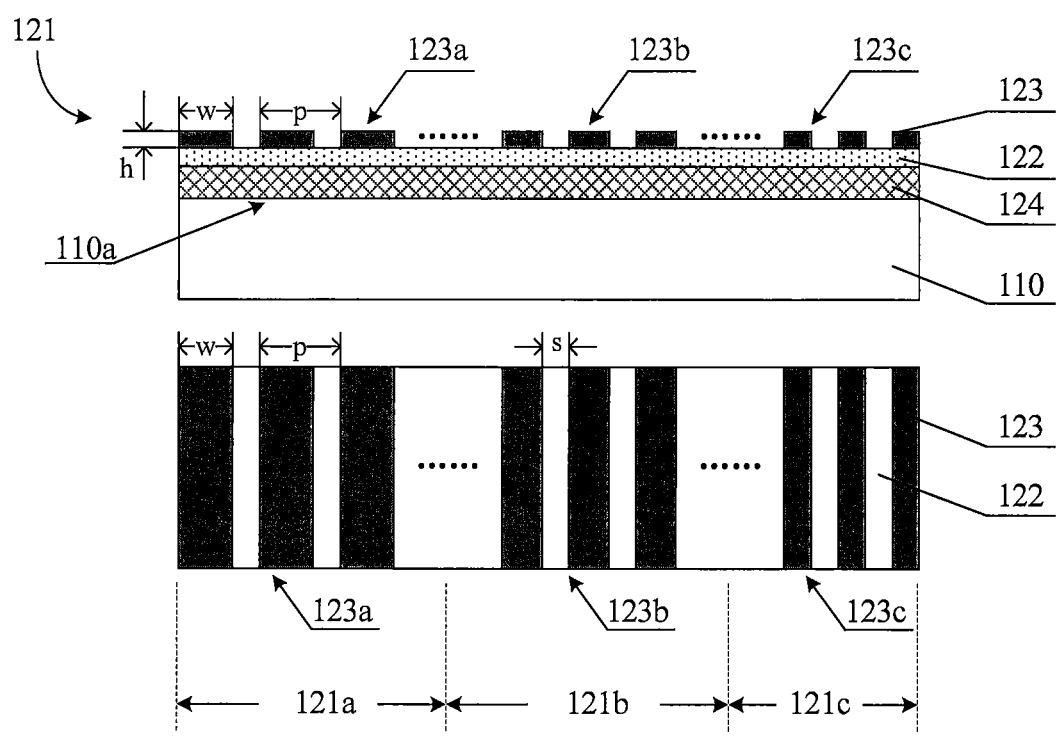
FIG. 6 schematically shows the structure of a holographic grating in the spectrometer as shown in FIG. 5 in the form of a sectional view and a top view.

It should be explained that in the present disclosure, the term "holographic grating" refers to a grating device comprising at least two different grating structures. Now referring to FIG. 6, and further referring to FIG. 5, FIG. 6 shows the structure of the holographic grating 121 in FIG. 5 in the form of a sectional view and a top view. As shown in FIG. 6, the holographic grating 121 comprises a waveguide layer 124 disposed on the light incidence surface 110a of the first substrate 110, a buffer layer 122 disposed on the waveguide layer 124, and a metal pattern layer 123 disposed on the buffer layer 122. The metal pattern layer 123 is used to form a grating structure, for example, but not limited to, by etching. The buffer layer 122 may increase the intensity of the monochromatic light having a target wavelength transmitted through the metal pattern layer 123. The waveguide layer 124 may restrain a part of the stray light transmitted through the metal pattern layer 123, so as to filter the monochromatic light obtained through the light splitting by the metal pattern layer 123.

As described above, the holographic grating 121 may be divided into, for example, a first light splitting area 121a, a second light splitting area 121b, and a third light splitting area 121c. The metal pattern layer in each light splitting area has a grating structure corresponding to the monochromatic light having a specific wavelength, and the metal pattern layer in each light splitting area has a different grating structure. As a non-limiting example, the grating structure in the metal pattern layer 123 may be defined by the following parameters: a line width w and a line spacing s of the lines forming the grating stripe, a period p, and an etching height (or line thickness) h. As shown in FIG. 6, the first, second and third light splitting areas 121a, 121b and 121c of the holographic grating 121 respectively have first, second and third grating structures 123a, 123b and 123c that are different from each other in the metal pattern layer 123.

The holographic grating light splitting principle will be described below, which is based on the diffraction grating formula shown as follows:

$$n_i * \sin \theta_i - n_d * \sin \theta_d = m * \lambda / \Lambda; \text{ wherein } m=0,\pm1,\pm2, \quad (1)$$

In the formula (1), $n_i$ and $\theta_i$ are the incident spatial refractive index and the incident angle respectively, m is the diffraction order, $\Lambda$ is the grating period, $\lambda$ is the incident light wavelength, $\theta_d$ is the angle between the diffraction light direction and the panel plane normal, $n_d$ is the equivalent refractive index of the metal pattern layer 123, the buffer layer 122, the waveguide layer 124 and the first substrate 110, and the refractive indexes of the above three layers themselves (the metal pattern layer 123, the buffer layer 122 and the waveguide layer 124) are quite close as well.

According to the formula (1), the grating structure may be designed to transmit monochromatic light having a specific wavelength. For example, it may be designed to filter various kinds of monochromatic light from the light within a wavelength range of 400-750 nm, such as the red-to-blue arrangement from left to right in FIG. 5. As a non-limiting example, the grating structure 123c in FIG. 6 may filter blue light, the grating structure 123b may filter green light, and the grating structure 123a may filter red light. That is to say, the entire holographic grating 121 is a non-uniform grating, which comprises specific grating periods designed according to the filtered wavelengths, and the period (p) comprises the line width (w)+the spacing (s). The design and optimization of the grating period may be, for example, based on the finite-difference time-domain (FDTD) optical simulation software design, and the parameters of the grating structure, such as the grating period and line width thereof for filtering the monochromatic light having a specific wavelength, may be optimized. In addition, for the sake of the possibility of actual processing, the etching depth of the microstructure pattern in the metal pattern layer 123 in FIG. 6 may be the entire thickness of the metal pattern layer 123.

For example, the above-mentioned metal pattern layer 123 may be made of 40 nm silver (chemical symbol: Ag), the buffer layer 122 may be 50 nm silicon dioxide ($SiO_2$), the waveguide layer 124 may be 100 nm silicon nitride ($SiN_x$), and the first substrate 110 may be a glass substrate, or resin or a polyester compound with good stability. The thickness of the first substrate 110 is set according to the actual requirements, and the present disclosure does not specifically define the thickness of the first substrate 110. By designing and processing one-dimensional holographic Ag metal pattern, white light may be split into a plurality of kinds of monochromatic light. When the periods of holographic grating are in the range of 250-600 nm, white light within a wavelength range of 400-750 nm may be split by first-order diffraction, and when the grating spacing is about 0.25-0.4 μm, the blue light to red light may be transmitted. When the line width of the holographic grating structure is too large or too small, the wavelength, half-peak width and transmission efficiency of the transmitted light will be affected to a certain extent, so it is necessary to reasonably design various parameters of the grating structure.

Based on the above explanation of the grating structure and the principle of holographic grating light splitting, it can be seen that if the light outlet of the grating structure is a half wavelength grating structure, the monochromatic light having various wavelengths may be extracted collimatedly, wherein the period of the grating structure is jointly determined by the wavelength of the monochromatic light to be emitted, the refractive indexes of emitted and incident materials, the angle of the incident light and the designed light emitting direction. The duty cycle of the grating is generally 0.5, which, however, may be deviated in the actual product design. The height of the grating may be determined according to the intensity of light having a certain wavelength or several wavelengths, and may be hundreds of nanometers, or may be a micrometer magnitude.

Figure 7:
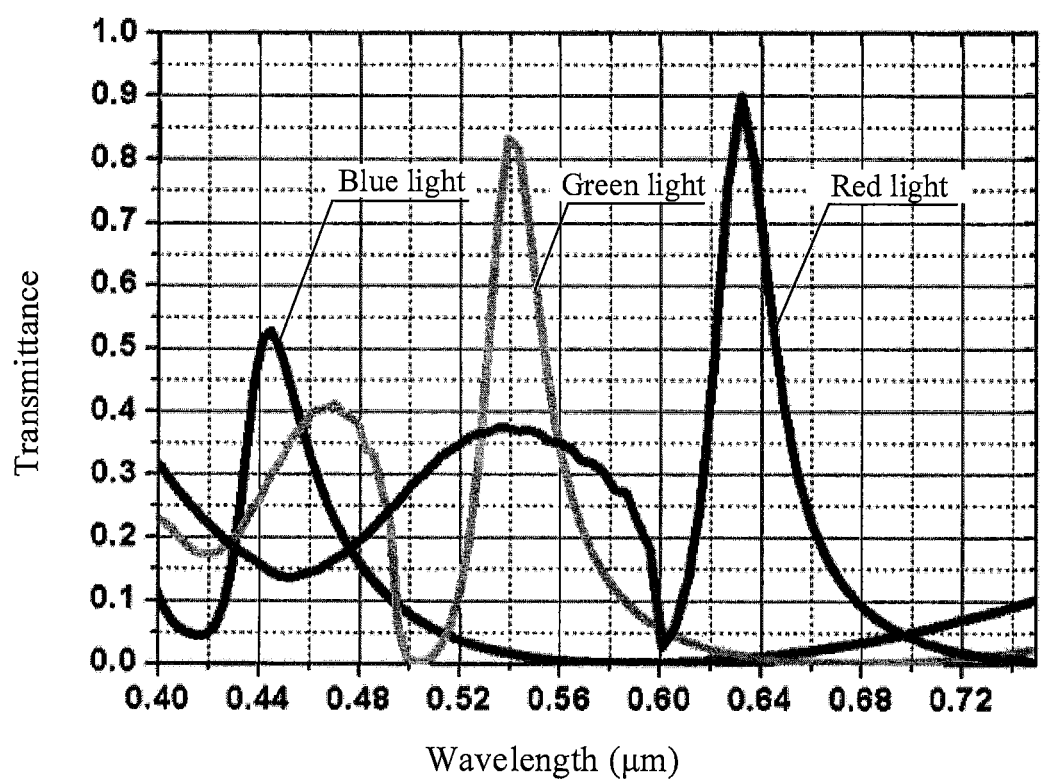
FIG. 7 is a schematic view of monochromatic light spectral information obtained through light splitting by the holographic grating in the spectrometer as shown in FIG. 6.

With reference to FIG. 7, it schematically shows the schematic view of spectral information obtained after light splitting of white light by the holographic grating 121 in the spectrometer 10 as shown in FIG. 5, wherein the horizontal coordinate is the wavelength with the unit of μm, and the longitudinal coordinate is the transmittance of normalization.

The holographic grating 121 may split white light within a wavelength range of 400-750 nm to form the spectral information as shown in FIG. 7. As a non-limiting example, when the red light having a wavelength of 630 nm needs to be filtered out of the white light and the light having other wavelengths be reflected, the geometric parameters of the grating structure of the first light splitting area 121a may be that: the period is 420 nm, the etching height of the metal pattern layer 123 is 40 nm, that is, the metal pattern layer of the Ag material is completely etched, and the line width is 315 nm. Using the grating structure with the above parameters, the red light within the primary wavelength range of 620-645 nm may be transmitted with a maximum transmittance of 0.9, and the light having other wavelengths may be absorbed or reflected. Similarly, for monochromatic light in other colors, such as green light having a wavelength of 540 nm and blue light having a wavelength of 450 nm, the grating structure may be designed according to the same principle so that these monochromatic light may also be transmitted. The following Table 1 shows the parameter requirements for the grating structure of the metal pattern layer 123 when transmitting monochromatic light having different wavelengths.

TABLE 1

| Wavelength (nm) | Period (nm) | Etching height (nm) | Line width (nm) |
| --- | --- | --- | --- |
| Red light (630 nm) | 420 | 40 | 315 |
| Green light (540 nm) | 380 | 40 | 285 |
| Blue light (450 nm) | 280 | 40 | 210 |

It should be noted that the parameters of the grating structures corresponding to monochromatic light having various wavelengths as shown in Table 1 are only a schematic description, rather than a limitation. It is easy to understand that the parameters in Table 1 may be recalculated, adjusted and optimized as desired.

It can be seen from the graph showing the red light within the wavelength range of 620-645 nm and the monochromatic light (including the green light and blue light) within other wavelength range as shown in FIG. 7 that there is stray light within other wavelength ranges in the spectral regions of the red light, green light and blue light. For example, in the red light spectral region, in addition to the red light within the wavelength range of 620-645 nm that may be transmitted through the holographic grating 121, the light within other wavelength ranges, especially the stray light formed by the transmission light within the wavelength range of 400-600 nm, may also be transmitted through the holographic grating 121 to a certain extent. These stray light may affect the detection precision and precision of the spectrometer, and therefore needs to be removed.

Figure 8:
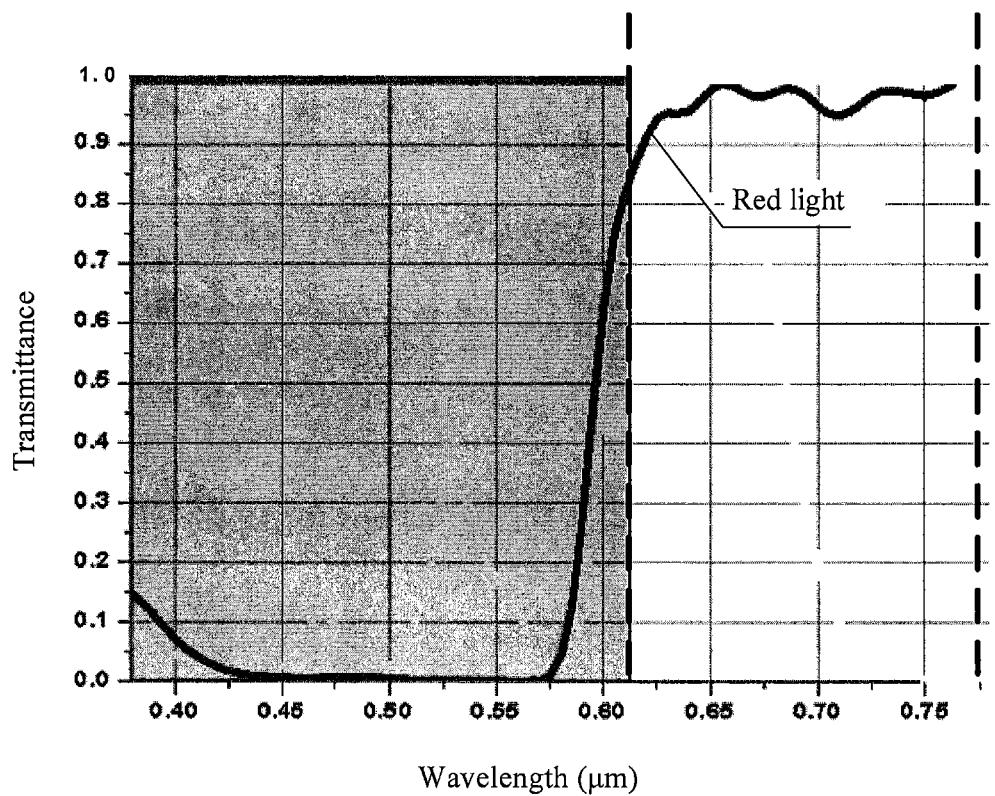
FIG. 8 is a schematic view of spectral information of a red color film.
Figure 9:
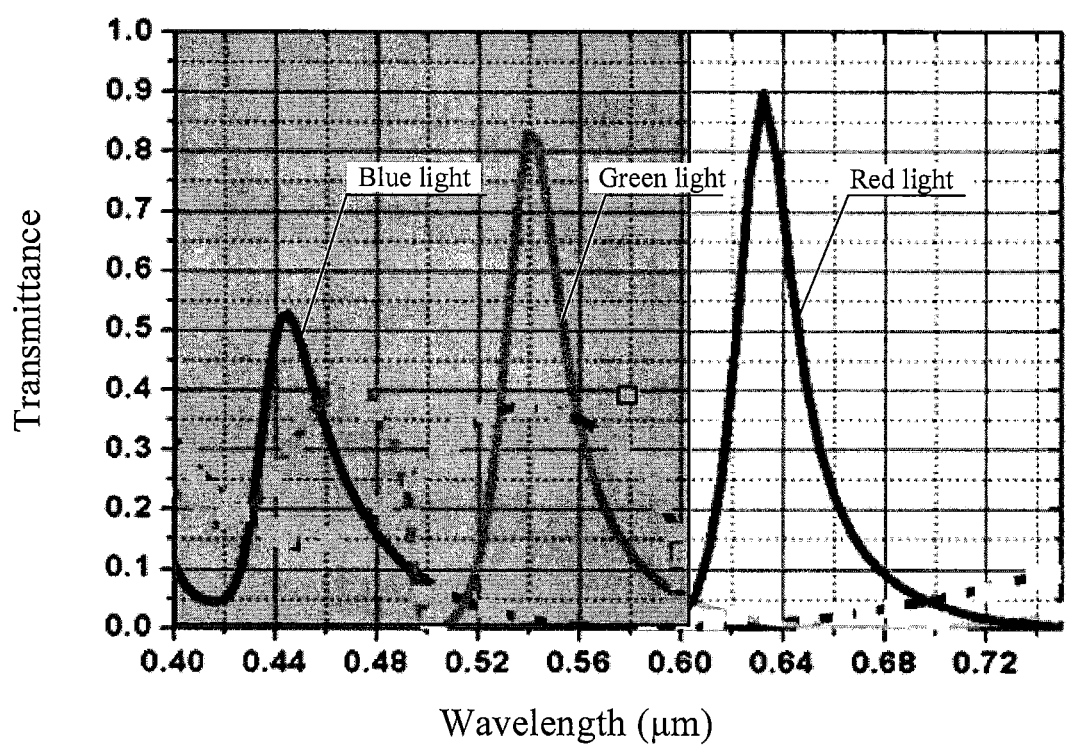
FIG. 9 is a schematic view of monochromatic light spectral information obtained through filtering the monochromatic light corresponding to the schematic view of monochromatic light spectral information shown in FIG. 7 by the red color film shown in FIG. 8.

To solve the above problem, the spectrometer 10 as shown in FIG. 5 according to the exemplary embodiment of the present disclosure uses the holographic grating 121 in combination with the light filter 133 to filter the stray light in the spectral information as shown in, e.g., FIG. 7, so as to leave only the monochromatic light within the target wavelength range. For example, for the red light spectral region, only the red light within a target wavelength range of 620-645 nm is left. For the spectrometer 10 as shown in FIG. 5, a light filtering color film may, e.g., be used as the filter 130. As a non-limiting example, a red color film may be used as the first light filtering unit 130a. With reference to FIG. 8, it shows the spectral information view of the red color film that may be used for the first light filtering unit 130a, wherein the horizontal coordinate is the wavelength with the unit of and the longitudinal coordinate is the transmittance of normalization. As shown in FIG. 8, the red color film allows the transmission of the light having a wavelength of 600-750 nm, while the light having other wavelengths (i.e. the light within a wavelength range of 400-600 nm) is absorbed by the red color film and cannot be transmitted. With reference to FIG. 9, it shows the effect of filtering the monochromatic light obtained through light splitting by the holographic grating 121 by the red color film, which indicates that only the red light within the wavelength range of 620-645 nm is transmitted.

Similarly, a blue color film may be used for blue light, and a green color film may be used for green light, so that only the monochromatic light within the target wavelength range may be retained.

By comparing the spectral information in FIGS. 7 and 9, there is still much stray light in the monochromatic light obtained only through the light splitting by the holographic grating 121 (see FIG. 7), while there is only extremely small amount of stray light in the monochromatic light within the target wavelength range obtained by the holographic grating in combination with the light filtering color film (i.e. by the way of light splitting and light filtering) (see FIG. 9). It can be seen that the optical device 100 in the spectrometer 10 as shown in FIG. 5 may greatly improve the phenomenon of spectral overlapping and chromatic crosstalk, thereby enhancing the detection effect of the spectrometer.

Figure 10:
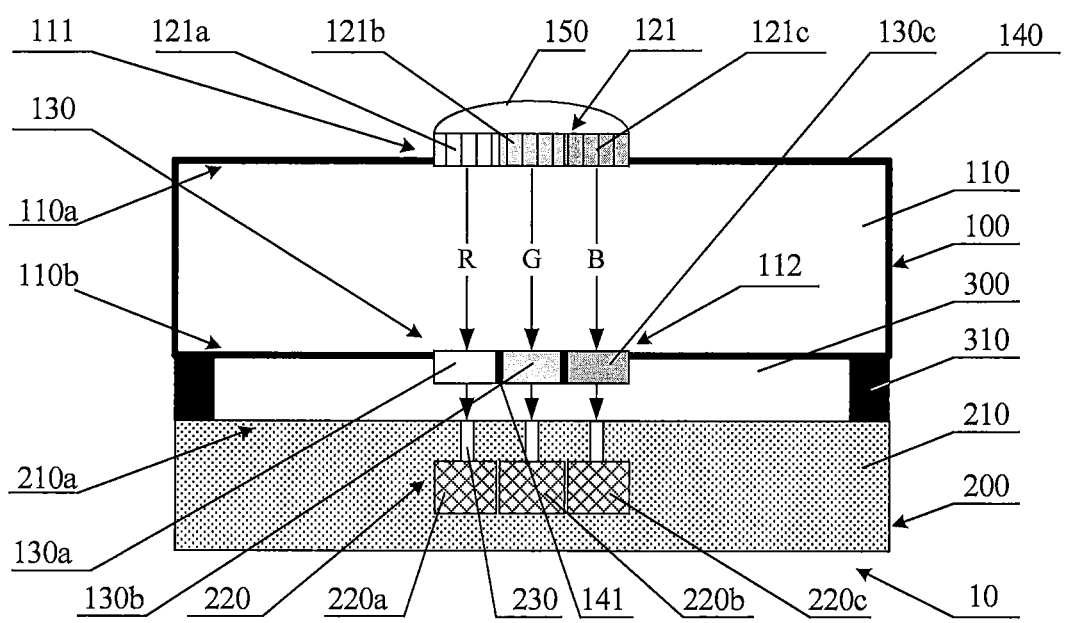
FIG. 10 is a structural schematic view of another spectrometer according to an exemplary embodiment of the present disclosure.

With reference to FIG. 10, it shows a structural schematic view of a yet spectrometer according to an exemplary embodiment of the present disclosure. In comparison with the spectrometer 10 as shown in FIG. 5, the spectrometer 10 as shown in FIG. 10 only differs in that the detection device 200 also comprises a microfluidic channel 230 arranged on the light incident side of each of the first, second and third detection units 220a, 220b and 220c. Each microfluidic channel 230 is used for the inflow of the object to be tested through the test channel 300, so that the monochromatic light within the target wavelength range emitted from the corresponding one of the first, second and third light filtering units 130a, 130b and 130c unit irradiates the corresponding the detection unit after passing through the object to be tested in the corresponding microfluidic channel 230.

As shown in FIG. 10, the microfluidic channel 230 is a channel for microfluid (i.e. an object to be tested) transmission. The width and height of the channel may be nanoscale, and may also be larger or smaller, which may be designed according to practical application. The present disclosure does not limit the size of the microfluidic channel 230. The microfluidic channel 230 may be fabricated, by photolithography or etching, on silicon, glass or a polymer, such as polydimethylsiloxane (PDMS) or polymethyl methacrylate (PMMA), or other materials. The present disclosure also does not limit the material and forming method of the microfluidic channel 230. The inner wall of the microfluidic channel 230 may be provided with a hydrophobic/hydrophilic film layer according to the actual use demands, so that the microfluid may flow or stay temporarily in the microfluidic channel 230 according to the experimental requirements. As a non-limiting example, a Teflon-AF hydrophobic layer may be used so that the microfluid does not adhere to the microfluidic channel 230 as much as possible, but flows as required.

In practical application, each microfluidic channel 230 in the exemplary embodiment of the present disclosure may be arranged perpendicular to the light incident side of the corresponding detection unit (shown in FIG. 10 by taking this arrangement for example) or in parallel to the monochromatic light emitted from the optical device 100, or may be arranged in other way. The principle for arrangement of the microfluidic channel 230 may be that the monochromatic light within the target wavelength range emitted from the optical device 100 may be incident into the microfluidic channel 230 to act with the object to be tested in the microfluidic channel 230, and then irradiate the corresponding detection unit.

Figure 11:
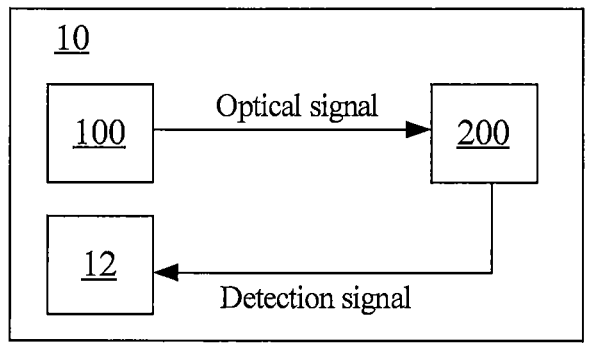
FIG. 11 schematically shows a structural block diagram of a spectrometer according to the above exemplary embodiments of the present disclosure, when comprising a processing module.

Now with reference to FIG. 11, it shows a spectrometer according to other exemplary embodiments of the present disclosure. The spectrometer 10 as shown in FIG. 11 comprises the components and devices described with respect to the above-mentioned various exemplary embodiments, and may also comprise a processing module 12 connected with the detection device 200 for receiving detection signals generated by the first, second and third detection units 220a, 220b and 220c, and processing these detection signals to obtain the analysis result of the object to be tested.

Optionally, in the exemplary embodiment of the present disclosure, the processing module 12 may be respectively connected with each detection unit in the detection device. In the case where the spectrometer comprises at least two detectors, the processing module 12 is also used for spectral analysis of the detection signals generated based on optical signals formed by the monochromatic light within the same target wavelength range in the detection units of different detectors. By taking the spectrometer as shown in FIG. 10 for example, the light source 150 (for example, comprising a micro-LED light source, and a micro-lens), the holographic grating 121 and the light filter 130 may be integratedly arranged on the first substrate 110, the second substrate 210 is integrated with the microfluidic channel 230 and the detector 220 (for example, a photosensitive detector), the wavelengths of the monochromatic light emitted from the first substrate 110 may correspond to the first, second and third detection units 220a, 220b and 220c in the second substrate 210 in a one-to-one relationship, so as to accurately monitor the optical signal passing through the object to be tested. In the detection process, the micro-LED light source is turned on. After the incident light is transmitted and split by the holographic grating 121 and the stray light is filtered by the first, second and third light filtering units 130a, 130b and 130c, different wavebands having a narrow half-peak width are emitted from different light emitting openings in the light emitting surface 110b of the first substrate 110. The gas or liquid to be tested passes through the microfluidic channels 230 in the second substrate 210, the monochromatic light within a specific target wavelength ranges act with the object to be tested, the first, second and third detection units 220a, 220b and 220c under the microfluidic channels 230 receive the final optical signals, and then return the data to the processing module 12 for data analysis, so as to complete the calibration or detection of a specific object or gas, that is, to complete the detection.

In addition, the processing module 12 according to the exemplary embodiment of the present disclosure may not only analyze the detection signal generated by each detection unit in a single detector so as to obtain the analysis result of the object to be tested according to the monochromatic light corresponding to the single detector, but also analyze the detection signals generated by the detection units in a plurality of detectors. For example, analysis may be conducted on the detection signals generated based on the monochromatic light having the same wavelength by the detection units in the plurality of detectors, i.e., multiple analysis results of the object to be tested obtained according to the plurality of monochromatic light beams having the same wavelength, and then these analysis results are analyzed by means of, e.g., calculating mean value, root mean square or mean square deviation, which is not limited in the present disclosure.

It should be noted that the monochromatic light finally emitted from the optical device 100 according to various exemplary embodiments of the present disclosure may be collimated monochromatic light or non-collimated monochromatic light. The direction of monochromatic light within the target wavelength range emitted from the optical device 100 may be set according to the design requirements of the actual product. If the optical device 100 emits collimated monochromatic light, then the collimated monochromatic light may be formed after the light splitting by the holographic grating 121, and the light filter only functions to filter stray light; it is also possible that no collimated monochromatic light, but the scattered monochromatic light, is formed after the light splitting by the holographic grating 121, and the light filter adjusts the transmission direction of the scattered monochromatic light while filtering the same so as to emit it in a collimated way. In the case where the optical device 100 emits the collimated monochromatic light, the emitted collimated monochromatic light may irradiate the detection device 200 collimatedly or uncollimatedly after irradiating the object to be tested in the test channel 300. For example, if the detection principle is to determine the molecular size by molecular scattering, the emitted collimated monochromatic light will change its direction and irradiate the detection device 200 uncollimatedly after passing through the object to be tested. In the specific implementation, when the monochromatic light irradiates the object to be tested, some effects, such as chromatic dispersion, will occur so that, in addition to the amplitude of light wave, the frequency of light, such as Raman spectrum, will also change. Therefore, the range of each original monochromatic light detected by the detection device 200 becomes smaller. In the exemplary embodiments as shown in FIGS. 1, 2, 5 and 10, the incident light, the monochromatic light emitted from the holographic grating 121, the monochromatic light within the target wavelength range emitted from the light filter, and the monochromatic light irradiating the detection device 200 are all shown as collimated light.

In each exemplary embodiment of the present disclosure, various kinds of monochromatic light may be obtained by the optical device 100, and each kind of monochromatic light is within a specific target wavelength range, that is, there is almost no stray light in each kind of the monochromatic light within a target wavelength range. In addition, the test channel 300 is arranged between the detection device 200 and the optical device 100, the light emitting side of the optical device 100 is close to the detection device 200, the test channel 300 in the middle is the channel through which the object to be tested flows. In practical application, the detection device 200 and the optical device 100 may form a hermetic space by a frame sealing glue 310. In the detection process, the gas or liquid to be tested is injected into the test channel 300 so as to flow through the test channel 300. When the monochromatic light within the target wavelength range passes through the test channel 300, it irradiates the object to be tested, and acts with the object to be tested, before irradiating the detection device 200. Therefore, the detection device 200 receives the optical signals after the monochromatic light within various target wavelength ranges acts with the object to be tested respectively, and may generate the detection signals accordingly. These detection signals may be used for analyzing the object to be tested, so as to complete the calibration or detection of the specific object or gas, that is, to complete the detection.

It should be noted that the spectrometer provided by each exemplary embodiment of the present disclosure is a micro spectrometer, which may filter out monochromatic light having a specific wavelength through a micro-nano structure, and locate and extract the monochromatic light within the target wavelength range with no need of a large-size mechanical drive assembly. In particular, the light filtering units face the detection units in a one-to-one relationship, so there is no problem of deflection angle as occurring in the existing spectrometer. The spectrometer is widely applicable in physical, biological and chemical fields, such as substance detection, calibration, molecular diagnosis, food quarantine, bacterial classification.

By setting an optical device comprising a light filter or an optical device comprising a light splitter and a light filter, the spectrograph according to each exemplary embodiment of the present disclosure allows the incident light to be decomposed into a variety of monochromatic light by the optical device before emission, and the emitted monochromatic light irradiates the object to be tested while passing through the test channel between the optical device and the detection device, and then irradiates the detection device, Thus, the detection device may receive the optical signals after the monochromatic light within target wavelength ranges acts with the object to be tested, and may generate the detection signals accordingly for spectral analysis of the object to be tested. In the spectrometer provided by some exemplary embodiments of the present disclosure, the monochromatic light having the target wavelength with no stray light may be obtained by the holographic grating in combination with the light filter, and such a micro-structured spectrometer may achieve the extraction of the monochromatic light having the target wavelength with no need of a large-size mechanical drive assembly. Therefore, it solves the problem that the detection effect of the spectrometer may be affected due to the phenomenon of spectral overlapping and chromatic crosstalk during light splitting by a conventional spectrometer, and the problem of deflection angle existing in a conventional spectrometer.

Figure 12:
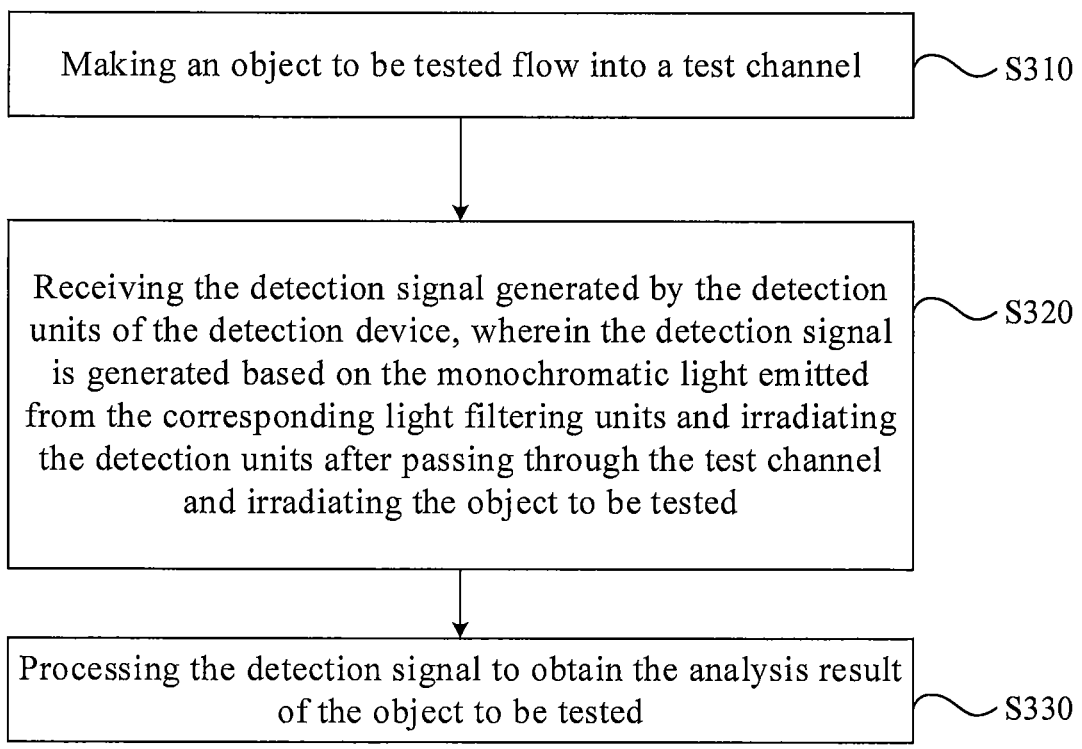
FIG. 12 is a flowchart of a spectral detection and analysis method according to an exemplary embodiment of the present disclosure.

Based on the spectrometer provided by the above exemplary embodiments of the present disclosure, the present disclosure also provides a spectral detection and analysis method, which may be implemented by the spectrometer according to any of the above exemplary embodiments of the present disclosure. As shown in FIG. 12, it is a flow chart of a spectral detection and analysis method according to an exemplary embodiment of the present disclosure, and the spectral detection and analysis method comprises the step of:

S310: making an object to be tested flow into a test channel;

S320: receiving a detection signal generated by the detection units of a detection device, wherein the detection signal is generated based on the monochromatic light emitted from the corresponding light filtering units and irradiating the detection units after passing through the test channel and irradiating the object to be tested; and S330: processing the detection signal to obtain the analysis result of the object to be tested.

The spectral detection and analysis method as shown in FIG. 12 may be implemented by any spectrometer as shown in FIGS. 1, 2, 4, 5 and 10. The specific structure of the spectrometer, the functions realized by each component thereof, and the advantageous effects of the spectral analysis have been described previously in detail, so it will not be reiterated. The steps S310 to S320 of the spectral detection and analysis method as described above may be implemented by the processing module (for example, which may be a processor) in the spectrometer.

In the above exemplary embodiment, it has been explained that the optical device of the spectrometer may emit monochromatic light corresponding to one or more detectors. For an application scenario where the monochromatic light corresponding to one detector is emitted only, spectral analysis may be conducted only on the optical signal formed by monochromatic light corresponding to each detection unit in the detector.

Optionally, for an application scenario where the optical device emits monochromatic light corresponding to at least two detectors, the method according to the exemplary embodiment of the present disclosure may also comprise the step of: conducting the spectral analysis of the optical signals formed by the monochromatic light within the same target wavelength range in different detectors.

In the exemplary embodiment of the present disclosure, not only the detection signal formed by the monochromatic light corresponding to each detection unit in a single detector may be analyzed to obtain the analysis result of the object to be tested, i.e., the analysis result is obtained by the monochromatic light corresponding to the single detection unit, but also the optical signals formed by the monochromatic light having the same wavelength in a plurality of detectors may be analyzed, i.e., multiple analysis results of the object to be tested are obtained according to the plurality of monochromatic light beams having the same wavelength, and then these analysis results are analyzed by means of, e.g., calculating mean value, root mean square or mean square deviation, which is not limited in the present disclosure. For example, the optical device may emit the monochromatic light corresponding to n detectors. The monochromatic light corresponding to each of the n detectors comprises red light, blue light and green light. Therefore, among the n detectors, the mean value of the detection signals formed by the red light, the mean value of the detection signals formed by the blue light, and the mean value of the detection signals formed by the green light may be calculated respectively.

Other exemplary embodiments of the present disclosure also provide a computer-readable storage medium, which stores executable instructions. When executed by the processor, the executable instructions may realize the spectral detection and analysis method according to any of the above exemplary embodiments of the present disclosure. The spectral detection and analysis method may be used for analyzing the object to be tested, so as to complete the calibration or detection of a specific object or gas, that is, to complete the detection. The implementation of the computer-readable storage medium provided by the exemplary embodiment of the present disclosure is basically the same as the spectral detection and analysis method provided by the above exemplary embodiment of the present disclosure, which will not be reiterated herein.

The above description is merely a depiction of the exemplary embodiments of the present disclosure and an explanation of applied technical principles. One skilled in the art should understand that the scope of the present disclosure is not limited to the technical solutions formed by the specific combination of the above technical features, but should also cover other technical solutions formed by any combination of the above technical features or their equivalent features without departing from the inventive concept and without violating technical principles. Furthermore, one skilled in the art can make various variations and modifications to the exemplary embodiments of the present disclosure as described without departing from the spirit of the present disclosure. These variations or replacements shall be deemed as falling within the scope of the present disclosure. Thus, the scope of protection of the present disclosure shall be determined based upon the scopes of the appended claims.

What is claimed is:

1. A spectrometer, comprising:
an optical device configured to receive a polychromatic incident light and emit at least two kinds of monochromatic light, the optical device comprising:
a first substrate comprising a transparent material and comprising a light incident surface and a light emitting surface parallel to each other, the light incident surface and the light emitting surface being provided with a light blocking layer, the light blocking layer on the light incident surface comprising at least one light incident opening, the light blocking layer on the light emitting surface comprising at least one light emitting opening, the at least one light incident opening being aligned with the at least one light emitting opening;
at least one light filter, the at least one light filter corresponding to the at least one light emitting opening, wherein each light filter is in a corresponding light emitting opening, wherein each light filter comprises at least two light filtering units, and wherein a light filtering unit of the at least two light filtering units is configured to transmit light having a wavelength within a wavelength range;

a detection device configured to receive the at least two kinds of monochromatic light emitted from the optical device and generate a detection signal, the detection device comprising:
- a support component comprising a light receiving surface that is adjacent and parallel to the light emitting surface of the first substrate so that a gap is formed between the light receiving surface and the light emitting surface to form a test channel; and
- at least one detector in the light receiving surface of the support component, and facing the at least one light filter in a one-to-one relationship, wherein each detector comprises at least two detection units that face at least two light filtering units in a corresponding light filter in a one-to-one relationship, wherein the at least one detector is configured to receive the monochromatic light emitted from the at least two light filtering units and passing through the test channel, and configured to generate electrical signals based on the monochromatic light that was received,
- wherein the monochromatic light emitted from the at least two light filtering units emit light along a direction perpendicular to the light emitting surface.

2. The spectrometer according to claim 1, wherein the first substrate comprises glass, resin or a polyester compound.

3. The spectrometer according to claim 1, wherein the support component is a second substrate comprising glass, resin, a polyester compound or paper.

4. The spectrometer according to claim 1, wherein the light filter comprises a light filtering color film.

5. The spectrometer according to claim 4, wherein the light filtering color film comprises a quantum dot color film.

6. The spectrometer according to claim 1, wherein the light filter comprises a linear gradient light filtering sheet.

7. The spectrometer according to claim 6, wherein the linear gradient light filtering sheet comprises:
- a first film layer comprising a first surface and a second surface forming a wedge angle; and
- a second film layer on the first surface and the second surface,
- wherein each part of the linear gradient light filtering sheet forms each light filtering unit in the light filter.

8. The spectrometer according to claim 7, wherein the first film layer comprises $SiO_2$, and the second film layer comprises $Ta_2O_5$.

9. The spectrometer according to claim 1, wherein a light blocking spacer is between adjacent light filtering units in each light filter.

10. The spectrometer according to claim 1, wherein the detector comprises a photosensitive detector.

11. The spectrometer according to claim 1,
- wherein the spectrometer further comprises at least one light source on the light incident surface of the first substrate and corresponding to the at least one light incident opening in a one-to-one relationship,
- wherein each of the at least one light source is on a corresponding light incident opening,
- wherein each of the at least one light source comprises a micro light-emitting diode and a micro lens, and
- wherein the micro lens is configured to expand and collimate the light emitted by the micro light-emitting diode.

12. The spectrometer according to claim 11, wherein the light source generates white light in a wavelength range of 400-750 nm.

13. The spectrometer according to claim 1,
- wherein the detection device further comprises a microfluidic channel on the light incident side of each detection unit of the at least two detection units,
- wherein each microfluidic channel is configured to be used for inflow of an object to be tested passing through the test channel, so that the monochromatic light within a target wavelength range emitted from a corresponding light filtering unit irradiates a corresponding detection unit of the at least two detections units after passing through the object to be tested in a corresponding microfluidic channel.

14. The spectrometer according to claim 13, wherein the microfluidic channel is provided therein with a hydrophobic film layer or a hydrophilic film layer.

15. The spectrometer according to claim 1,
- wherein the optical device further comprises at least one light splitter,
- wherein the at least one light splitter corresponds to the at least one light incident opening in a one-to-one relationship,
- wherein each light splitter is in a corresponding light incident opening and configured to split the polychromatic incident light entering the light incident opening into at least two kinds of monochromatic light, and
- wherein the at least two kinds of monochromatic light correspond to at least two light filtering units in a corresponding light filter in a one-to-one relationship, and are filtered by a corresponding one of the light filtering units and emitted from the corresponding one of light filtering units.

16. The spectrometer according to claim 15,
- wherein the light splitter comprises a holographic grating comprising a waveguide layer, a buffer layer and a metal pattern layer sequentially arranged on the light incident surface of the first substrate, and
- wherein the metal pattern layer comprises at least two areas with different grating structures, and
- wherein each grating structure corresponds to one of the at least two kinds of monochromatic light.

17. The spectrometer according to claim 15, wherein the light filtering unit comprises a filter grating configured to emit corresponding monochromatic light along the direction perpendicular to the light emitting surface.

18. The spectrometer according to claim 1, further comprising:
- a processing module connected with the detection units, which is configured to receive the detection signal generated by the detection units and processes the detection signal to obtain an analysis result of the object to be tested.

19. A spectral detection and analysis method using the spectrometer according to claim 1, comprising:
- making the object to be tested flow into the test channel;
- receiving the detection signal generated by the detection units of the detection device, wherein the detection signal is generated based on the monochromatic light emitted from the corresponding light filtering units and irradiating the detection units after passing through the test channel and irradiating the object to be tested; and
- processing the detection signal to obtain the analysis result of the object to be tested.

* * * * *